(12) United States Patent
Strauss

(10) Patent No.: US 9,545,112 B1
(45) Date of Patent: Jan. 17, 2017

(54) CAKE SLICER

(71) Applicant: Steven Strauss, Singapore (SG)

(72) Inventor: Steven Strauss, Singapore (SG)

(*) Notice: Subject to any disclaimer, the term of this patent is extended or adjusted under 35 U.S.C. 154(b) by 0 days.

(21) Appl. No.: 14/878,396

(22) Filed: Oct. 8, 2015

Related U.S. Application Data

(60) Provisional application No. 62/206,881, filed on Aug. 19, 2015.

(51) Int. Cl.
*A21C 5/08* (2006.01)
*A21C 15/04* (2006.01)
*B26D 3/24* (2006.01)

(52) U.S. Cl.
CPC .............. *A21C 15/04* (2013.01); *B26D 3/24* (2013.01)

(58) Field of Classification Search
CPC .................................. A21C 15/04; B26D 3/24
USPC ............................................ 30/114, 280, 282
See application file for complete search history.

(56) References Cited

U.S. PATENT DOCUMENTS

| | | | | |
|---|---|---|---|---|
| 3,075,565 A * | 1/1963 | Weaver | ............... | B26B 29/063 33/525 |
| 3,452,795 A * | 7/1969 | Davies | ............... | B26B 29/063 83/762 |
| 5,115,704 A * | 5/1992 | Hyman | ............... | B26B 29/063 83/467.1 |
| 5,456,010 A * | 10/1995 | Bryda | ............... | B26B 3/04 30/286 |
| 8,215,218 B2 * | 7/2012 | Al-Heraibi | ............... | B26D 1/30 30/114 |

\* cited by examiner

*Primary Examiner* — Omar Flores Sanchez
(74) *Attorney, Agent, or Firm* — Porter, Wright, Morris & Arthur, LLP

(57) ABSTRACT

A cake slicer adapted to cut a cake with a knife comprises a control platform, and a main housing unit formed with a wall extending perpendicular from the centering platform, defining a pair of cutting slots adapted to receive the knife. A centering platform is adapted to receive the cake. Either the control platform or the main housing unit is provided with alignment tabs, and the other defines a series of alignment slots each adapted to receive a corresponding alignment tab so as to hold the main housing unit in a cutting position with respect to the control platform.

7 Claims, 4 Drawing Sheets

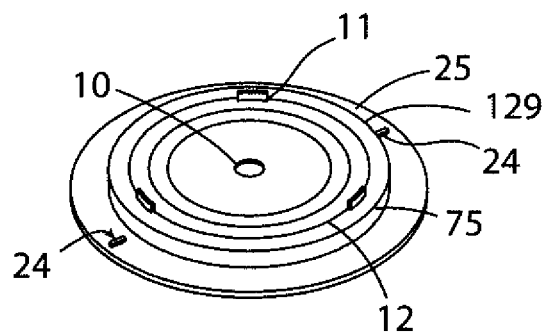
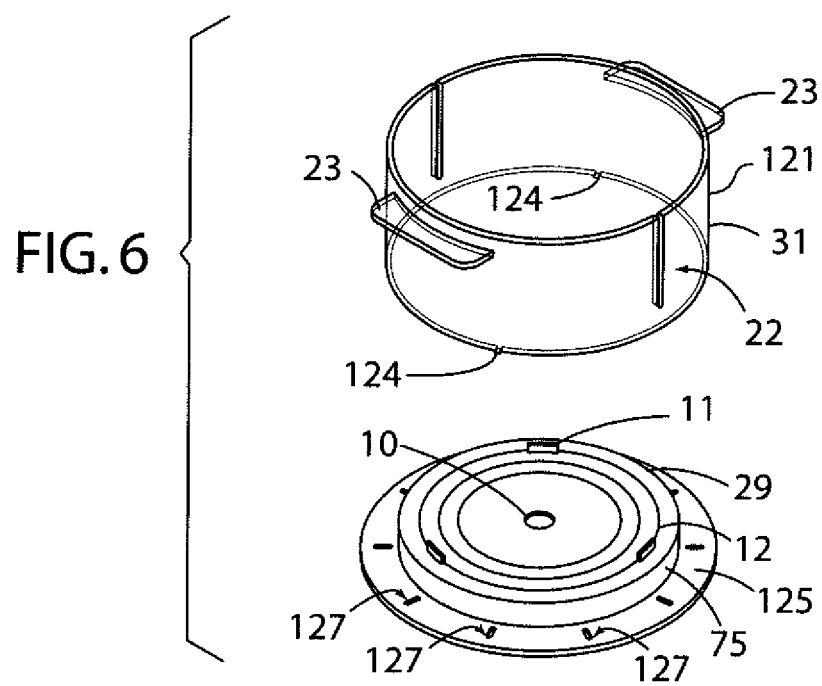

CAKE SLICER

This application claims priority benefit of U.S. Provisional Patent application 62/206,881, filed on Aug. 19, 2015.

FIELD OF THE INVENTION

This invention relates to cake slicers, and more particular to improved cake slicers suitable for cutting controlled and uniform slices of cake.

BACKGROUND OF THE INVENTION

Pastry shops, hotels and restaurants often sell cakes. Such cakes can be cut with a knife. However, aesthetics and portion control are very important for places that sell such cakes. Moreover, being able to cut your own cakes, instead of outsourcing the cutting from a cake supplier, allows the cakes to stay fresh longer. Generally, the longer a particular person has to cut cakes, the greater the chance for aesthetically unacceptable errors to occur. Two main problems are fatigue and inexperience which can result in misalignment of the cake prior to cutting, cutting the cake in uneven slices or at a bad angle. Any of these problems can make a cut cake unattractive.

Cakes can be cut in many different ways. For restaurants serving cakes, it is highly desirable that cakes be cut in a controlled and uniform manner. Cake markers can be used where a cake is marked and then cut with a knife into relatively even divided portions. However sometimes the person cutting the cake will slice the cake to one side or the other instead of at a desired cut angle at 90 degrees with respect to the cake. This usually happens when the person cutting the cakes starts to get tired from cutting too many cakes, loses attention or just does not have the experience to cut cakes uniformly.

Large high volume machines are available for cake cutting, but are typically priced beyond the reach of most pastry shops and restaurants. Devices suitable for smaller volumes include slicers deploying a plurality of knife blades and/or slicers using a wire. Both of these known designs have problems. Wire cutter designs often have difficulty cutting cakes uniformly down and then back up again. This can result in a partial tear or disruption of the cake. Multi-blade designs, while efficient, can also produce aesthetically unattractive cake slices.

Another known device for cutting cakes, especially round cakes, has the cake placed on a dial and then a retractable tray. The tray carrying the cake is then withdrawn into the machine where it is aligned with a blade which cuts the cake. The cake and tray may then be rotated about a center axis so that the blade can make another cut. This process can continue until a predetermined number of cuts has been made. Such machines work well if the cake is properly aligned prior to insertion into the machine. However, since the operator cannot see the cake being cut (since it is inside the machine when cut) he cannot tell if the cake is misaligned and therefore mis-cut until after the cutting process is complete. Inexperienced operators using such equipment may misalign the cake on the tray, and thereby make aesthetically unattractive cake slices. Such irregular cake slices typically cannot be sold to customers at full value. It would be desirable to provide a cake slicer of a cost affordable for a typical pastry shop, hotel or restaurant, which is easy to use and provides increased reliability and uniformity in cake slicing.

SUMMARY OF THE INVENTION

In accordance with a first aspect, there is provided a cake slicer adapted to cut a cake with a knife comprises a control platform, and a main housing unit formed with a wall extending perpendicular from the centering platform, defining a pair of cutting slots adapted to receive the knife. A centering platform is adapted to receive the cake. Either the control platform or the main housing unit is provided with alignment tabs, and the other defines a series of alignment slots each adapted to receive a corresponding alignment tab so as to hold the main housing unit in a cutting position with respect to the control platform.

From the foregoing disclosure and the following more detailed description of various embodiments it will be apparent to those skilled in the art that the present invention provides a significant advance in the technology of cake slicers. Particularly significant in this regard is the potential the invention affords for providing a high quality cake slicer which can be used by inexperienced staff and still produce uniform cake slices. Additional features and advantages of various embodiments will be better understood in view of the detailed description provided below.

BRIEF DESCRIPTION OF THE DRAWINGS

FIG. 5 is an isometric view of alternate embodiment showing a unitary control platform and centering platform.

FIG. 6 is an exploded isometric view of another embodiment showing tabs on the main housing unit and slots on the control platform.

Figure 1:
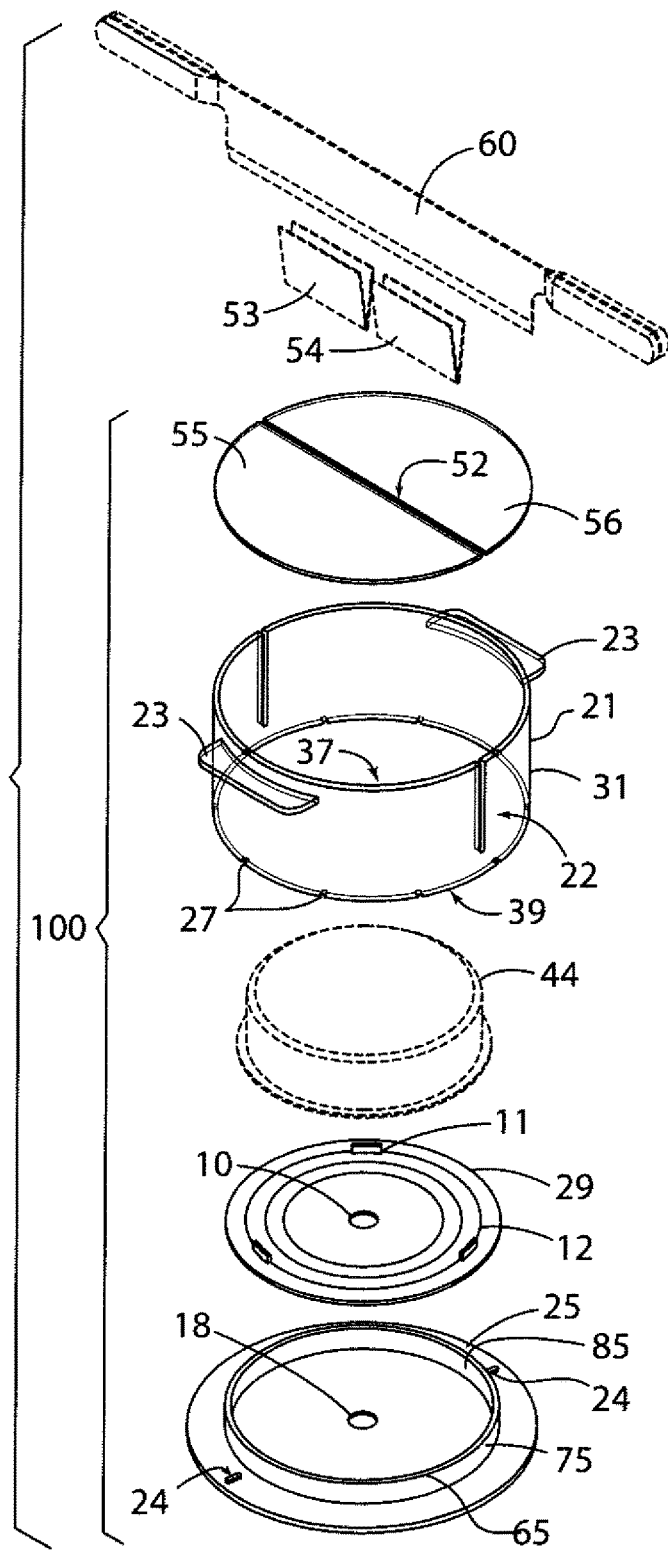
FIG. 1 is an exploded isometric view of a cake slicer in accordance with an embodiment suitable for cutting round cakes.

It should be understood that the appended drawings are not necessarily to scale, presenting a somewhat simplified representation of various features illustrative of the basic principles of the invention. The specific design features of the cake slicer as disclosed here, including, for example, the specific number of inserts (corresponding to the number of slices), will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the cake slicer disclosed here. The following detailed discussion of various alternate features and embodiments will illustrate the general principles of the invention with reference to a cake slicer for use with a round cake. Other embodiments suitable for other applications such as square cakes and other shapes will be apparent to those skilled in the art given the benefit of this disclosure.

Turning now to the drawings, FIG. 1 shows an exploded isometric view of a cake slicer 100 in accordance with one embodiment suitable for cutting round cakes, comprising main housing unit 21 and control platform 25. A centering platform 29 adapted to receive a cake 44 is also shown, along with optional plates 55, 56 which may be placed on the main housing unit to define a slot 52 which cooperates with slot 22 in the main housing unit to receive knife 60 to cut the cake. The main housing unit 21 can be formed having a generally cylindrical shape or pipe shaped, such that the unit has a circumferential wall with a central opening sized to receive a cake. The main housing unit 21 is shown with two vertical guiding or cutting slots 22 formed in the centre of the unit that diametrically oppose each other. When assembled with optional plates 55, 56, slot 52 aligns with guiding slots 22 to allow the knife to enter guiding slots 22. Alignment slots 27 cooperate with alignment tabs 24 to releasably secure the main housing unit 21 to the control unit. In the embodiment shown in the drawings, two alignment tabs 24 are formed on the control platform 25 and the alignment slots 27 are formed on the main housing unit 21. The relative position of the alignment tabs and slots may be reversed, with the slots formed from the control platform and the alignment tabs formed from the main housing unit. The main housing unit 21 and control platform 25 may advantageously comprise a transparent plastic such as an acrylic or a polycarbonate. Transparent plastics are desirable here in allowing a person cutting the cake a good view of each cake to be cut. Further, since plastics are lightweight it is easy to carry and adjust components of the cake slicer. Optionally the tabs may be formed as unitary extensions of the main housing unit or of the control platform 25. Alternatively, the tabs may be formed on a separate component and made of a strong material such as steel. The separate component with the tabs may then be connected with either the lightweight wall 31 to form the main housing or connected to the control platform.

Although the cake may be cut without use of cake paper, FIG. 1 shows the optional use of plates 55, 56 which are nearly hemispherical shaped. The slot 52 formed between the plates is adapted to receive cake paper 53, 54 which is pushed by the knife 60 into the cake, such that each piece of cake is protected by the paper. The paper allows the cake to stay fresher longer, and allows for transportation of the cake pre-cut into slices, if desired by the customer.

Figure 2:
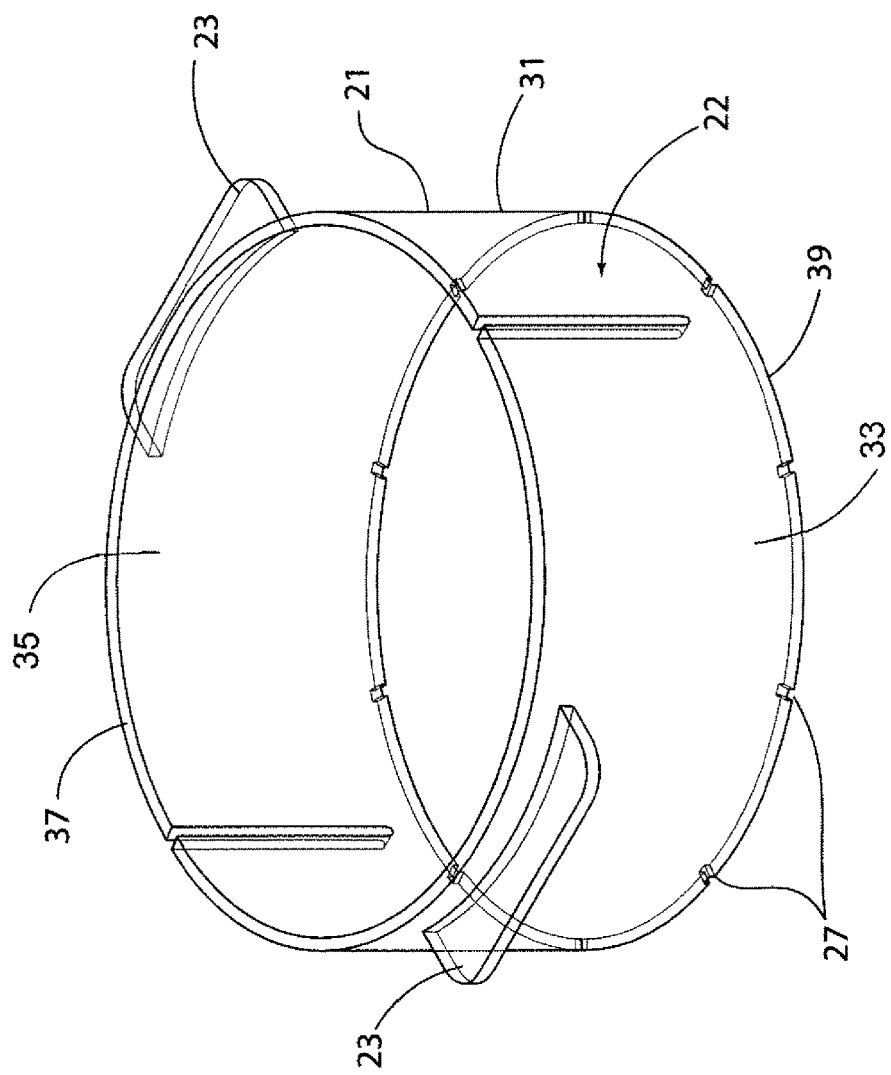
FIG. 2 is an isolated isometric view of a main housing unit of the cake slicer of FIG. 1.

FIG. 2 shows an isolated isometric view of the main housing unit 21 of the embodiment of FIG. 1. Two handles 23 may be formed, optionally as unitary extensions of wall 31 (shown as a cylindrical wall). These handles are shown in FIG. 2 opposed one another and centred in between the guiding slots 22, such that a center of each slot is 90 degrees from a center of each handle about the circumferential wall 31 of the main housing unit 21, such that the handles are equidistant from the guiding slots 22. The wall 31 has an outer surface 33, and inner surface 35, a top surface 37 and a bottom surface 39. The guiding slots extend to the top surface 37, and when used, plates for cake paper insertion rest on the top surface 37. When assembled into a cutting position, the inner surface 35 of the main housing unit is adjacent an outside 75 of the control platform 25. In the embodiment shown in the drawings, alignment slots 27 are positioned circumferentially around the bottom surface 39 of the wall 31. Preferably the slots are positioned equidistantly apart from one another, here with a round cake, 10 slots at thirty-six degrees apart from one another. Although only two tabs are shown on the control platform, each on an opposite side of the cake to be cut, embodiments may also be provided with additional pairs of tabs which engage corresponding equidistantly spaced slots 24 on the main housing unit 21 when the main housing unit 21 is in the cutting position with respect to the control platform. As noted above, the positions of the alignment tabs and slots may be reversed so that the main housing unit defines a series of alignment tabs (preferably at least two on opposite sides) each adapted to receive a corresponding alignment slot so as to releasably hold the main housing unit in the cutting position with respect to the control platform. The alignment tabs may be formed as unitary extensions of either the main housing unit or the control platform. FIG. 6 shows an example of this, with a pair of tabs 124 formed on an alternate main housing unit 121, with corresponding slots 127 formed on an alternate control platform 125.

Figure 3:
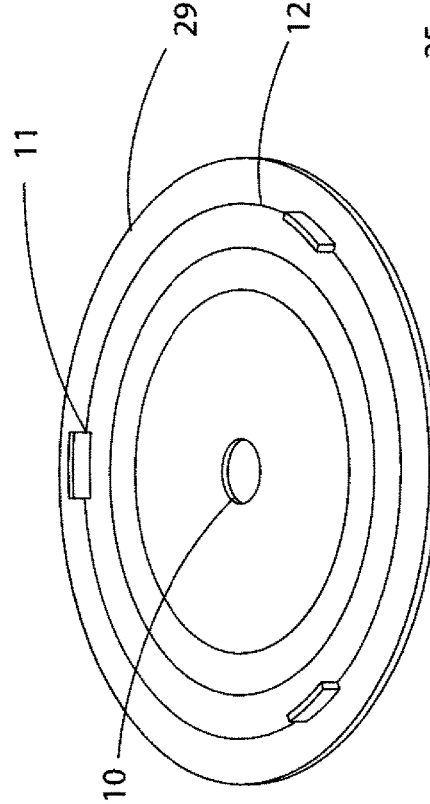
FIG. 3 is an isolated isometric view of a control platform of the cake slider which cooperates with the main housing unit of FIG. 2.

FIG. 3 is an isolated isometric view of the centering platform 29, shown formed as a round generally flat plate having a series of concentric alignment circles. As with the other elements of this embodiment, the centering platform is designed for a round cake. The centering platform 29 may be formed of the same material as the other elements, a generally transparent plastic such as acrylic or polycarbonate, for example. The centering platform 29 is formed with guides 11. As shown in FIG. 3 there are three guides each positioned circumferentially around a top surface of the centering platform about equidistant (120 degrees) apart. The guides may be adjustably mounted on the centering platform to handle cake boards of varying diameters. The circles 12 can be etched into the top surface of the centering platform to serve as a guide for centering different sized cake boards (carrying a cake). A hole 10 may be provided at the center of the centering platform for ease in handling.

Figure 4:
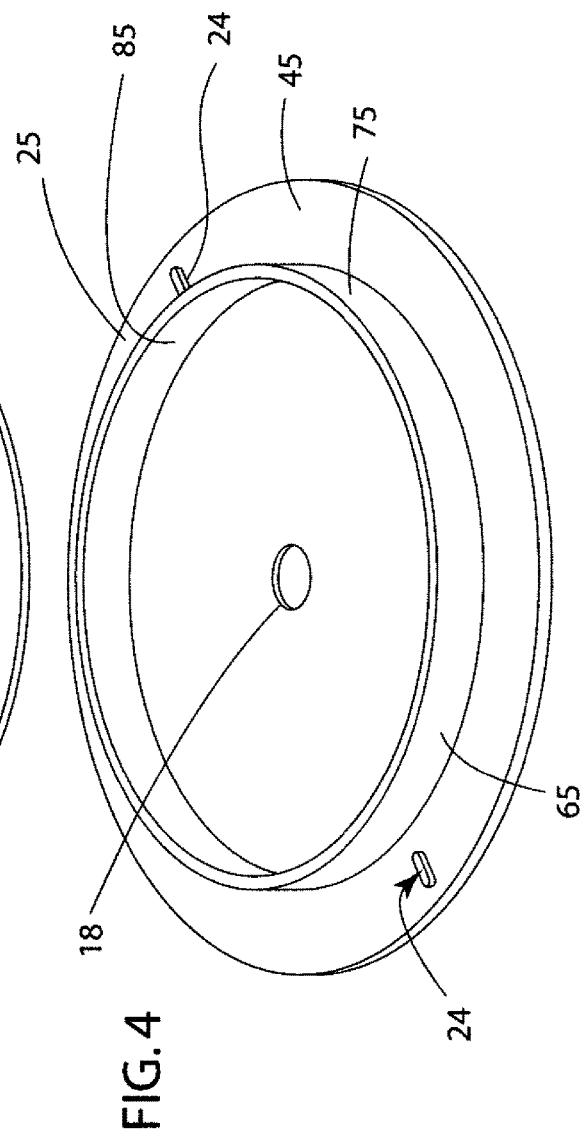
FIG. 4 is an isolated isometric view of a centering platform of the cake slicer which is used in conjunction with the control platform of FIG. 3 and the main housing unit of FIG. 2 to center a cakeboard (and cake resting on the cakeboard).

FIG. 4 shows an embodiment of the control platform 25 suitable for use with round cakes of varying diameters. As noted above, the control platform 25 may be made of the same material as the main housing unit such as an acrylic or other transparent plastic. The control platform of FIG. 4 is shown having a flat base 45, a vertical projection 65 with the outside 75 and inside 85, and alignment tabs 24 positioned in the base 45. The vertical projection or pipe shaped piece 65 extends circumferentially around the base of the control platform 25, and may be formed as a unitary extension of the control platform or formed as a separate piece and glued or otherwise fastened or attached to the base 45 of the control platform 25. Preferably the alignment tabs are positioned on opposite sides of the control platform 25, shown in this embodiment 180 degrees apart. The alignment tabs engage corresponding slots 27 in the main housing unit 21 when assembled together in the cutting position. A center hole 18 may be provided as well to help with handling.

It is important in cake cutting to make sure that the cake is centred as perfectly as possible on a corresponding cake board of the cake. Optionally a little icing may be placed on a bottom of the cake board so that once the cutter centers the cake on the board friction is increased to help resist movement of the cake while completing icing.

In operation, center a cake board on the centering platform 29, using the alignment circles 12 for reference. Once this is done lock optional adjusting screws (not shown) can be used to hold the cake board in place with respect to the centering platform (in embodiments where the centering platform is separate from the control platform). Next the centering platform 29 with the cake centred is placed on top of the control platform 25 so that the centering platform is centred on the control platform. Optionally an underside of the centering platform may cooperate with the topside of the vertical projection to resist side to side movement of the centering platform with respect to the control platform. The main housing unit 21 is placed over the control platform 25, placing the main housing unit in the cutting position. The main housing unit may be rotated using the side handles 23 to the right or left until the alignment tabs 24 align with the alignment slots 27. At this point the cake is ready to be cut. Any type of knife will work but the knife should be long enough to extend between the cutting/guiding slots 22. For best results a double handled cheese knife 60 may be used, as it has been found that such a knife enhances operator control while cutting. The knife extends through both of the cutting/guiding slots 22. After making the first cut withdraw the knife and lift the main housing unit again by the handles 23 and rotate the main housing until each pair of alignment tabs 24 present engage with the next pair of corresponding alignment slots 27, thereby moving the main housing unit to another cutting position with respect to the control platform. As shown in the embodiment of the Figs., ten slices of cake can be made with five cuts. That is, the main housing unit has five cutting positions. Of course, other embodiments will be readily apparent to those skilled in the art given the benefit of this disclosure which can cut eight, twelve or fourteen slices, for example. Also, use of several different centering platforms and control platforms allows for several different shaped or sized cakes to be lined up and ready to cut merely by lifting the main housing unit onto the next cake to be cut. The invention disclosed herein is a very elegant way of cutting a cake uniformly such that makes it look like the cake is cut by a professional or a very expensive machine.

As a representative example suitable for many types of cakes commonly sold in the restaurant business, the guiding slots 22 may extend about 4⅞" down from the top edge of the main housing unit. Control platform 25 is formed as a generally round plate of, for example, a 13¾" diameter and 3/16" thick material. The vertical projection 65 can have a diameter of about 11¼" and extend 1¼" high above the base. The centering platform can be 11¼" in diameter and 3/16" thick to handle most normal sized round cakes and pies. The guides 11 may be 1¼" long, ¼" in diameter and 3/16" thick, for example. Other sizes for the elements of the cake slicer suitable for cutting other sized cakes will be readily apparent to those skilled in the art given the benefit of this disclosure.

From the foregoing disclosure and detailed description of certain embodiments, it will be apparent that various modifications, additions and other alternative embodiments are possible without departing from the true scope of the invention. For example, FIG. 5 shows an isometric view of alternate embodiment showing a unitary control platform and centering platform 129. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A cake slicer adapted to cut a cake with a knife comprising, in combination:
   a control platform;
   a main housing unit formed with a wall extending perpendicular from the control platform, the wall circumferentially surrounding a central opening adapted to receive the cake to be cut, and defining cutting slots adapted to receive the knife, wherein the main housing unit has handles formed as unitary projections of the main housing unit and extending perpendicularly from the wall, and the main housing unit can be moved to a different cutting position with respect to the cake without movement of the cake to be cut; and
   a centering platform adapted to receive the cake to be cut, formed separately from the main housing unit;
   wherein one of the control platform and the main housing unit is provided with alignment tabs, and the other of the control platform and the main housing unit defines a series of alignment slots each adapted to receive a corresponding alignment tab so as to hold the main housing unit in one of a plurality of cutting positions with respect to the control platform and to the cake to be cut;
   wherein the control platform has a vertical projection with an inside closer to a center of the control platform and an outside remote from the center of the control platform, the wall of the main housing unit has an inner surface and an outer surface, and when the main housing unit is in one of the plurality of cutting positions with respect to the control platform, the inner surface of the wall is adjacent the outside of the vertical projection such that the vertical projection is within the central opening defined by the main housing unit.

2. A cake slicer adapted to cut a cake with a knife comprising, in combination:
   a control platform;
   a main housing unit formed with a wall extending perpendicular from the control platform, the wall circumferentially surrounding a central opening adapted to receive the cake to be cut, and defining cutting slots adapted to receive the knife;
   wherein one of the control platform and the main housing unit is provided with alignment tabs, and the other of the control platform and the main housing unit defines a series of alignment slots each adapted to receive a corresponding alignment tab so as to hold the main housing unit in one of a plurality of cutting positions with respect to the control platform and to the cake to be cut; and
   a centering platform adapted to receive the cake to be cut and positioned on the control platform;
   wherein the main housing unit has a top surface and a bottom surface, and the cutting slots extend from the top surface and the one of the alignment tabs and alignment slots extend from the bottom surface;
   wherein neither the alignment tabs nor the alignment slots are in contact with the centering platform;
   wherein the control platform has a vertical projection with an inside closer to a center of the control platform and an outside remote from the center of the control platform, the wall of the main housing unit has an inner surface and an outer surface, and when the main housing unit is in one of the plurality of cutting positions with respect to the control platform, the inner surface of the wall is adjacent the outside of the vertical projection such that the vertical projection is within the central opening defined by the main housing unit.

3. The cake slicer of claim 2 wherein the vertical projection has a top and the centering platform is adapted to rest on the top.

4. The cake slicer of claim 2 wherein the vertical projection is positioned between a center of the control platform and the one of the alignment tabs and alignment slots of the control platform.

5. The cake slicer of claim 1 wherein the control platform has the alignment tabs and the main housing unit has the alignment slots, and the centering platform is positioned on the control platform, and the main housing unit circumferentially surrounds the centering platform.

6. The cake slicer of claim 2 wherein two of the alignment tabs are positioned equidistant from one another and formed on the control platform and the series of alignment slots are formed on the main housing unit and are each adapted to receive a corresponding alignment tab so as to hold the main housing unit in one of a plurality of cutting positions with respect to the control platform and to the cake to be cut;

wherein the wall of the main housing unit is cylindrical shaped, and rotation of the main housing unit to align a different pair of the alignment slots with the two alignment tabs moves the main housing unit from an initial one of the plurality of cutting positions to another one of the plurality of cutting positions with respect to the control platform and the cake to be cut, and cutting of the cake in the another one of the plurality of cutting positions cuts the cake in a different location than the cut made in the initial one of the plurality of cutting positions; and the main housing unit circumferentially surrounds the centering platform.

7. The cake slicer of claim 1 wherein the centering platform and control platform are unitary.

* * * * *